United States Patent
Choi et al.

(10) Patent No.: US 8,891,559 B2
(45) Date of Patent: Nov. 18, 2014

(54) APPARATUS AND METHOD FOR NOTIFYING PACKET INFORMATION USING START FRAME DELIMITER

(75) Inventors: Hyun-Kuk Choi, Suwon-si (KR);
Seok-Yong Lee, Yongin-si (KR);
Sae-Rome Kim, Suwon-si (KR);
Chang-Ryong Heo, Seoul (KR);
Sung-Min Kim, Suwon-si (KR); Ki-Uk Kim, Suwon-si (KR)

(73) Assignee: Samsung Electronics Co., Ltd (KR)

(*) Notice: Subject to any disclaimer, the term of this patent is extended or adjusted under 35 U.S.C. 154(b) by 82 days.

(21) Appl. No.: 13/635,165

(22) PCT Filed: May 7, 2010

(86) PCT No.: PCT/KR2010/002933
§ 371 (c)(1),
(2), (4) Date: Sep. 14, 2012

(87) PCT Pub. No.: WO2011/138989
PCT Pub. Date: Nov. 10, 2011

(65) Prior Publication Data
US 2013/0010809 A1    Jan. 10, 2013

(51) Int. Cl.
| H04J 3/12 | (2006.01) |
| H04L 12/54 | (2013.01) |
| H04W 4/18 | (2009.01) |
| H04L 27/34 | (2006.01) |
| H04L 25/02 | (2006.01) |
| H04L 7/04 | (2006.01) |

(52) U.S. Cl.
CPC ............. *H04L 12/56* (2013.01); *H04L 27/345* (2013.01); *H04W 4/185* (2013.01); *H04L 25/0262* (2013.01); *H04L 7/041* (2013.01)
USPC .......................................... 370/522

(58) Field of Classification Search
CPC . H04L 25/0262; H04L 1/0023; H04L 1/0025; H04L 1/0032; H04L 7/04–7/042; H04L 27/3854; H04L 27/362; H04L 27/36; H04L 27/345; H04J 3/06; H04J 3/0635; H04W 4/18; H04W 4/185; H04W 4/20
USPC .......................... 370/503–506, 509, 522, 527
See application file for complete search history.

(56) References Cited

U.S. PATENT DOCUMENTS

| 7,530,001 B2 | 5/2009 | Naoi | |
| 7,764,664 B2 * | 7/2010 | Zeng et al. | 370/349 |

(Continued)

FOREIGN PATENT DOCUMENTS

| CN | 1179049 | 4/1998 |
| CN | 101150508 | 3/2008 |

(Continued)

OTHER PUBLICATIONS

PCT/ISA/237 Written Opinion issued on PCT/KR2010/002933 (pp. 4).

(Continued)

*Primary Examiner* — Min Jung
(74) *Attorney, Agent, or Firm* — The Farrell Law Firm, P.C.

(57) ABSTRACT

An apparatus for notifying packet information using a start frame delimiter (SFD) comprises: a SFD transmission unit which generates an SFD code and transmits a packet by positioning the generated SFD code in a position corresponding to specific additional information to notify the specific additional information; and a SFD reception unit which receives the packet from the SFD transmission unit, detects the position of the SFD code positioned within the packet, and detects the additional information corresponding to the detected position.

10 Claims, 3 Drawing Sheets

(56) References Cited

U.S. PATENT DOCUMENTS

| | | | |
|---|---|---|---|
| 7,792,091 B2 * | 9/2010 | Sahinoglu et al. | 370/349 |
| 7,990,937 B2 * | 8/2011 | Chang et al. | 370/338 |
| 8,094,592 B2 * | 1/2012 | Roy | 370/310 |
| 8,223,820 B2 * | 7/2012 | Rouxel | 375/150 |
| 8,422,512 B2 | 4/2013 | Yu et al. | |
| 2004/0141468 A1 | 7/2004 | Christensen et al. | |
| 2006/0156203 A1 | 7/2006 | Naoi | |
| 2006/0285604 A1 | 12/2006 | Walton et al. | |
| 2008/0226293 A1 | 9/2008 | Ogushi | |
| 2008/0240167 A1 | 10/2008 | Ivonnet et al. | |
| 2009/0022139 A1 | 1/2009 | Lee et al. | |
| 2009/0103437 A1 * | 4/2009 | Kim et al. | 370/235 |
| 2009/0168849 A1 * | 7/2009 | Rouxel | 375/140 |
| 2009/0213008 A1 | 8/2009 | Paek et al. | |
| 2010/0008383 A1 * | 1/2010 | Koga et al. | 370/503 |
| 2010/0302079 A1 * | 12/2010 | Brunner et al. | 341/100 |

FOREIGN PATENT DOCUMENTS

| | | |
|---|---|---|
| CN | 101335587 | 12/2008 |
| JP | 2006-197173 | 7/2006 |
| JP | 2006-253987 | 9/2006 |
| JP | 2011-146974 | 7/2011 |
| JP | 2011-530933 | 12/2011 |
| KR | 1020080084741 | 9/2008 |
| KR | 100954170 | 4/2010 |
| RU | 2 342 798 | 12/2008 |
| RU | 2 380 823 | 1/2010 |
| WO | WO 2010/018519 | 2/2010 |

OTHER PUBLICATIONS

PCT/ISA/210 Search Report issued on PCT/KR2010/002933 (pp. 3).

* cited by examiner

| type 1 | Data rate A bps |
| type 2 | Data rate B bps |
| type 3 | Data rate C bps |
| type 4 | ACK type packet indicator |
| type 5 | NAK type packet indicator |
| ... | ... |
| type N | Broadcasting type packet indicator |

APPARATUS AND METHOD FOR NOTIFYING PACKET INFORMATION USING START FRAME DELIMITER

TECHNICAL FIELD

The present invention relates to the transmission of a packet, and more particularly to a method for delivering additional information by using a Start Frame Delimiter (SFD) of a communication system which transmits packet data by using wireless communication.

BACKGROUND ART

It is usual that a packet-based wireless communication system includes a transmission unit and a reception unit and the transmission unit and the reception unit transmit and receive data between each other by using a packet. The transmission unit transmits a synchronization signal so that the start of a frame can be recognized. A sequence agreed by the transmission side and the reception side is used for the transmission of a synchronization signal. A preamble sequence and a Start Frame Delimiter (SFD) are used as the synchronization signal as described above. When data is transmitted and then received by using the synchronization signal, after bit synchronization is acquired by using a preamble sequence and a start time point of a frame is detected by using an SFD, the demodulation of the data is started.

FIG. 1 is a view illustrating the structure of an existing data transmission packet. In FIG. 1, a data transmission packet includes a preamble, SFD, a header, user data, and a Frame Check Sequence (FCS). Referring to FIG. 1, after a start time point of a frame is found by using the preamble and the SFD, user data is demodulated with reference to a demodulation parameter of the header. Parameters transmitted through the header include multiple pieces of information for seeking efficient use of transmission resources, such as information for supporting the transmission of a large amount of data in the case of a good channel environment, information for minimizing the amount of data transmission and ensuring reception gain in the case of a poor channel environment, etc.

However, in a wireless connection environment where there exist various systems including a 1:1 communication system, a communication system supporting an ad-hoc network, a communication system supporting 1 to multiple (1 to n) connections, etc., a communication system must support various packet lengths and various speeds of data transmission in order to have an efficient communication means, and successful demodulation of a header must be accomplished in order to succeed in transmitting and receiving user data of the communication system. In a system supporting various speeds of data transmission, because information on a transmission speed is provided through a header, a speed of transmission of a header must be fixed, and the highest reception performance must be maintained. Therefore, in order to successfully demodulate a header, a transmission speed must be fixed to the lowest transmission speed allowed by the relevant communication system.

It is natural that reception performance should be secured by causing a speed of transmission of a header to be the lowest speed in order to deliver packet demodulation information in a poor channel environment. However, when data is intended to be transmitted at a high speed in a good channel environment, a speed of transmission of a header fixed to the lowest speed, which corresponds to overhead, is a waste of transmission resources. For example, when a transmission speed of a communication system supports 62.5 kbps/125 kbps/500 kbps/1 Mbps, a speed of transmission of a header is fixed to 62.5 kbps. At this time, when communication is intended to be performed at a speed of 1 Mbps, due to a fixed speed of transmission of a header, the throughput of the communication system is reduced. Therefore, in the communication system supporting various speeds of data transmission, there is a need for a method for improving the throughput of the communication system without the occurrence of overhead even when the length of a packet is short.

DISCLOSURE

Technical Problem

Therefore, the present invention has been made in view of the above-mentioned problems, and the present invention provides an apparatus and a method, which add additional information to a Start Frame Delimiter (SFD) and improve the throughput of a communication system itself without the occurrence of overhead, even when the length of a packet is short in the communication system supporting various speeds of data transmission in order to cope with a wireless channel environment.

Technical Solution

In accordance with an aspect of the present invention, there is provided an apparatus for delivering packet information by using a start frame delimiter, the apparatus including: an SFD transmission unit for generating a start frame delimiter (SFD) code, and locating the generated SFD code at a position corresponding to particular supplementary information and transmitting a packet, in order to notify the particular supplementary information; and an SFD reception unit for receiving the packet from the SFD transmission unit, detecting a position of the SFD code located in the received packet, and detecting supplementary information corresponding to the detected position of the SFD code.

In accordance with another aspect of the present invention, there is provided a method for delivering packet information by using a start frame delimiter, the method including: generating a start frame delimiter (SFD) code; generating garbage data in order to discriminate a position of the SFD code from another position of the SFD code; controlling the position of the generated SFD code in order to map supplementary information intended to be transmitted; and transmitting a packet including the controlled SFD code.

In accordance with another aspect of the present invention, there is provided a method for receiving packet information by using a start frame delimiter, the method including: detecting a preamble field corresponding to a previous field of the start frame delimiter (SFD) in order to recognize a time point of reception of an SFD field; detecting a position of an SFD code included in a received packet; identifying supplementary information mapped to the detected position of the SFD code; and analyzing the identified supplementary information.

Advantageous Effects

According to the present invention, by adding additional information to a start frame delimiter, information of a received packet is identified even without demodulating a header of the received packet in such a manner as to previously identify information of a packet, so as to improve the throughput of a communication system of itself.

BRIEF DESCRIPTION OF THE DRAWINGS

The foregoing and other objects, features and advantages of the present invention will become more apparent from the following detailed description when taken in conjunction with the accompanying drawings in which.

BEST MODE

Mode for Invention

Hereinafter, exemplary embodiments of the present invention will be described in detail with reference to the accompanying drawings. The following description includes specific details such as elements, etc., and the specific details are only provided in order to help a more comprehensive understanding of the present invention. Therefore, it will be apparent to those skilled in the art that predetermined changes in form and details may be made in the specific details without departing from the scope of the present invention.

The present invention proposes a method for identifying information of a received packet without demodulating a header of the received packet in such a manner as to previously identify information of a packet. To this end, the method according to the present invention includes a process of including supplementary information to an SFD, and a process of identifying the SFD including the supplementary information before demodulating a header, by a reception side. Particularly, the method for identifying information of a received packet without demodulating a header, proposed in the present invention, may be expected to simplify complex hardware and improve the throughput of an overall communication system.

Elements of an SFD and the operation thereof in a packet where functions as described above are implemented, will be described with reference to FIG. 2.

Figure 1:
FIG. 1 is a view illustrating the structure of an existing data transmission packet.
Figure 2:
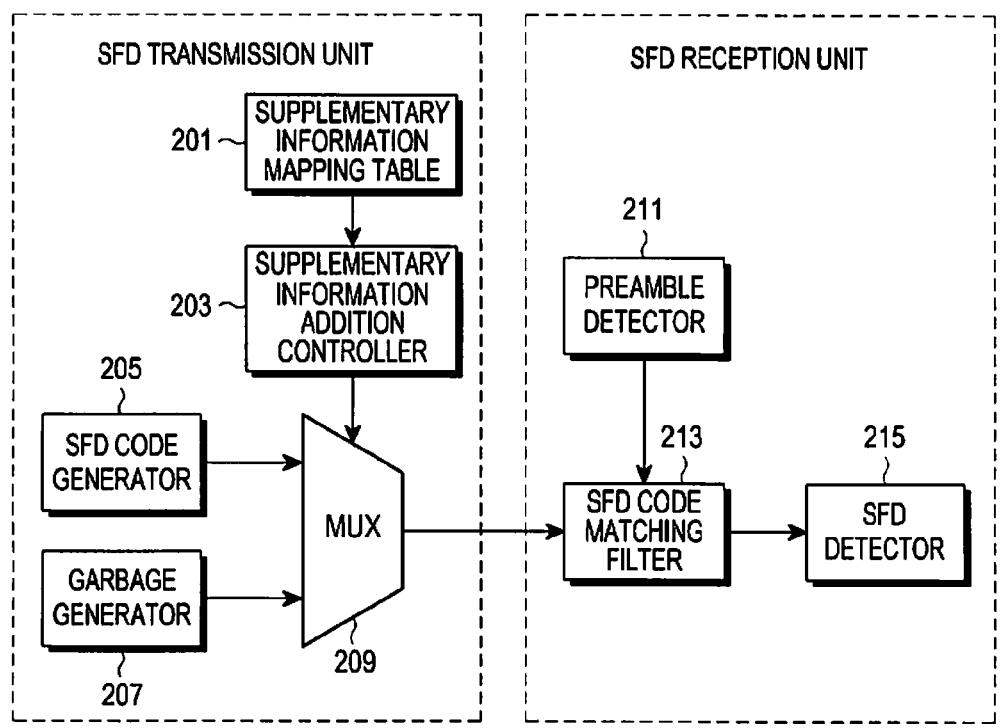
FIG. 2 is a block diagram illustrating an internal configuration of a Start Frame Delimiter (SFD) according to an embodiment of the present invention.

FIG. 2 is a block diagram illustrating an internal configuration of a Start Frame Delimiter (SFD) according to an embodiment of the present invention. Referring to FIG. 2, an SFD is largely divided into an SFD transmission unit and an SFD reception unit. The transmission unit includes a supplementary information mapping table 201, a supplementary information addition controller 203, an SFD code generator 205, and a garbage generator 207. The reception unit includes a preamble detector 211, an SFD code matching filter 213, and an SFD detector 215. First, elements in the SFD transmission unit will be described below.

The SFD code generator 205 generates an SFD code. Because only one SFD code is used in the present invention, the generation of an SFD code is completed once. Also, in order to discriminate between receptions according to a time difference, an SFD code is generated in such a manner as to be shorter than the length of an entire SFD field. The SFD code generated as described above has supplementary information which is different according to the position of the generated SFD code.

The garbage generator 207 generates garbage data. The garbage data does not include particular information, and is used to discriminate between positions of SFD codes. The garbage data is included within a time period other than a time period from a start time point to an end time point of the generated SFD code. Supplementary information that an SFD code has, is different according to a position at which this garbage data is included.

The supplementary information mapping table 201 matches supplementary information with each type. The supplementary information mapping table 201 is previously defined in the SFD transmission unit and the SFD reception unit, and may be adjusted through negotiation between the SFD transmission unit and the SFD reception unit.

The supplementary information addition controller 203 first senses the position of an SFD code and then determines which supplementary information is to be added to the SFD code. For example, when the position of the SFD code is on the front side, supplementary information of type A may be added to the SFD code. On contrast, when the position of the SFD code is on the rear side, supplementary information of type B may be added to the SFD code.

The SFD code generated by the SFD code generator 205 and the garbage data generated by the garbage generator 207 are transmitted to a multiplexer (MUX) 209. Also, the supplementary information addition controller 203 generates a packet, to which particular supplementary information is added, by using the SFD code and the garbage data, and transmits the generated packet to the SFD reception unit.

Next, elements in the SFD reception unit will be described below.

The preamble detector 211 detects a preamble field corresponding to a previous field in order to recognize a time point of the reception of an SFD field. The preamble detector 211 enables the recognition of a start time point of the SFD.

The SFD code matching filter 213 detects a correlation value of the received SFD code by using the SFD code received from the SFD transmission unit. Namely, the SFD code matching filter 213 senses at which position the SFD code received from the SFD transmission unit is located, and calculates a correlation value of the received SFD code according to the relevant position. For example, when the SFD reception unit receives the SFD code controlled in the form of supplementary information of type A from the SFD transmission unit, the SFD code matching filter 213 may recognize that the SFD transmission unit has transmitted the supplementary information of type A, according to information on a start time point of an SFD field and a time point of the occurrence of a maximum correlation value within a time period of the SFD field, by using the same supplementary information mapping table as that of the SFD transmission unit.

The SFD detector 215 detects information on a start time point of an SFD field and a time point of the occurrence of a maximum value within a time period of the SFD field. The detection of the information as described above makes it possible to identify which type of supplementary information the SFD transmission unit has transmitted.

Figure 3:
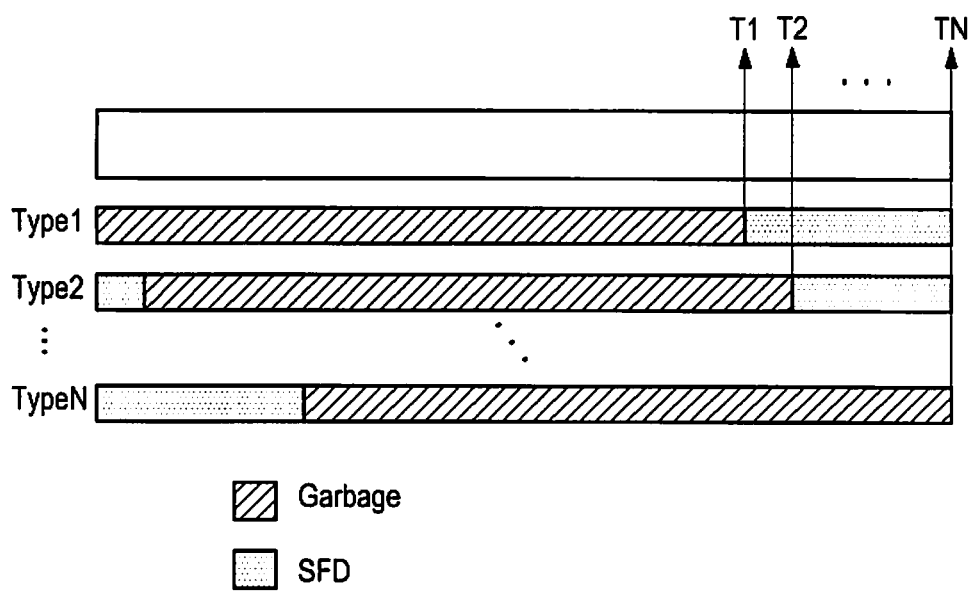
FIG. 3 is a view illustrating the structure of an SFD field according to an embodiment of the present invention.

FIG. 3 is a view illustrating the structure of an SFD field according to an embodiment of the present invention.

Referring to FIG. 3, because only one SFD code is generated, the length of an SFD code included in an SFD field does not change. Type 1 represents a case where an SFD code is located on the front of an SFD field without empty space at the beginning of the SFD field. Namely, the SFD code is located from a first start point of the SFD field to a point of completion of the SFD code. Garbage data is located from the point of completion of the SFD code to the last point of the SFD field. Herein, a time point of completion of the SFD code is defined as T1. T1 is a time value for discriminating supplementary information of type 1 from information of another type in the SFD field.

It is possible to acquire different time values T2 to TN for discriminating between types of supplementary information according to a point where the SFD code is located in the SFD field in the method as described above. The different time values T1 to TN for discriminating between types of supplementary information depend on a point of completion of the SFD code. As described above, a discrimination is made between types of supplementary information according to a point where the SFD code is located, by using one identical SFD code. Therefore, when the SFD reception unit subsequently performs demodulation, the demodulation may be performed only by constructing a single hardware for demodulating a code.

Figures 4, 5:
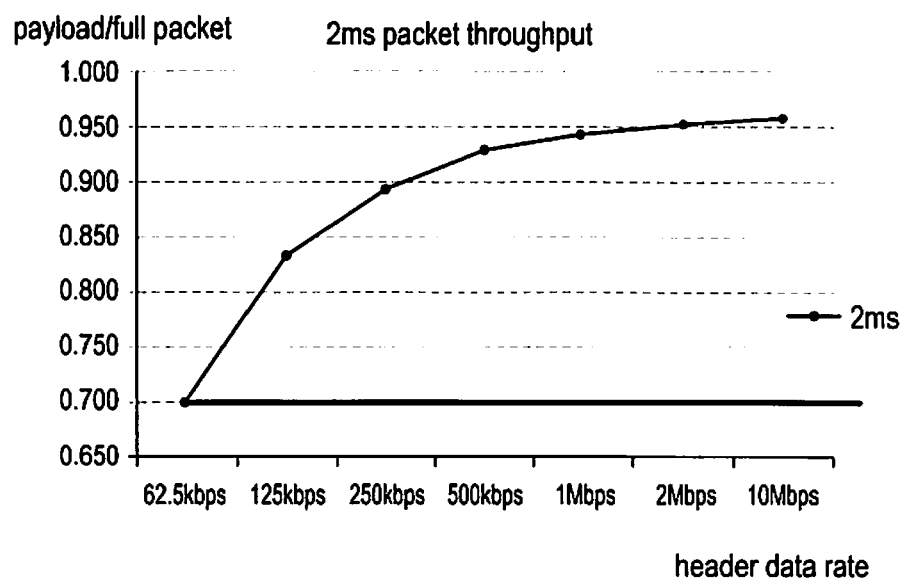
FIG. 4 is a view illustrating the configuration of a supplementary information mapping table of an SFD according to an embodiment of the present invention.
FIG. 5 is a graph illustrating a throughput of a communication system according to an embodiment of the present invention.

FIG. 4 is a view illustrating the configuration of a supplementary information mapping table of an SFD according to an embodiment of the present invention. As noted in FIG. 4, different pieces of supplementary information are mapped according to type 1 to type N, respectively. The SFD supplementary information mapping table as shown in FIG. 4 may have different contents of supplementary information from those shown in FIG. 4, may be previously defined, and may be shared by both the SFD transmission unit and the SFD reception unit. Also, the SFD supplementary information mapping table may be adjusted through negotiation between the SFD transmission unit and the SFD reception unit.

FIG. 5 is a graph illustrating a throughput of a communication system according to an embodiment of the present invention. Referring to FIG. 5, when it is assumed that use is made of a relatively short packet having a length of 2 m, in the case of fixing an existing speed of transmission of a header to 62.5 kbps which is the lowest speed, it can be noted that the relevant throughput is equal to about 70%. However, when additional information was added to an SFD as in the present invention instead of fixing a speed of transmission of a header to a predetermined value, it can be noted that the relevant throughput was equal to about 83% at a speed of transmission of a header of 125 kbps, and that the relevant throughput was equal to about 94% at a speed of transmission of a header of 2 Mbps. Herein, the throughput is a value obtained by dividing the length of user data by the entire length of a packet. When the technical idea of the present invention is applied, it can be noted that the throughput was improved by about 24% over the existing throughput.

As described above, the configuration and the operation may be made of the apparatus and the method for delivering packet information by using a start frame delimiter according to an embodiment of the present invention. Meanwhile, while the invention has been shown and described with reference to exemplary embodiments thereof, it will be understood by those skilled in the art that various changes in form and details may be made therein without departing from the spirit and scope of the invention. Therefore, the spirit and scope of the present invention is not limited to the described embodiments thereof, but is defined by the appended claims and equivalents thereof.

The invention claimed is:

1. An apparatus for transmitting packet information by using a Start Frame Delimiter (SFD), the apparatus comprising:
an SFD code generator for generating the SFD code:
a controller for controlling to be generated the SFD code corresponding to particular supplementary information to be included in a packet, and placing the generated SFD code at a position within the packet according to a type of the particular supplementary information; and
an SFD transmission unit for transmitting the packet including the placed SFD code; and
an SFD reception unit for receiving the packet from the SFD transmission unit, detecting the position of the SFD code in the received packet, and detecting the particular supplementary information according to the detected position of the SFD code within the packet.

2. The apparatus as claimed in claim 1, further comprising:
a garbage generator for generating garbage data that discriminates the SFD code located at the position within the packet from another instance of the SFD code located at another position within the packet; and
a supplementary information mapping table for storing each of different types of supplementary information wherein each of the different types of different supplementary information corresponds to different respective positions of the SFD code within the packet,
wherein the controller determines which supplementary information is to be included in the packet according to the position of the SFD code and the supplementary information mapping table.

3. The apparatus as claimed in claim 2, wherein the supplementary information mapping table is previously defined, is shared by the SFD transmission unit and an SFD reception unit, and is capable of changing the supplementary information under an agreement of the SFD transmission unit and the SFD reception unit.

4. A method for delivering packet information by using a Start Frame Delimiter, the method comprising:
generating an SFD code to be included in a packet;
generating garbage data that discriminates the SFD code located at a position within the packet from another instance of the SFD code located at another position within the packet;
determining the position of the generated SFD code within the packet according to a type of particular supplementary information to be included in the packet; and
transmitting the packet including the SFD code at the determined position which represents the particular supplementary information.

5. The method as claimed in claim 4, wherein determining the position of the generated SFD code comprises determining whether to include the garbage data before or after the SFD code within the packet according to the type of the particular supplementary information desired by a user to be included in the packet.

6. A method for receiving packet information by using a Start Frame Delimiter (SFD), the method comprising:
receiving a packet;
detecting, from within the received packet, a preamble field corresponding to SFD and recognizing a time point of reception of an SFD field included in the detected preamble;
detecting a position of an SFD code included in the recognized SFD field;
identifying supplementary information mapped to the detected position of the SFD code; and
analyzing the identified supplementary information.

7. The method as claimed in claim 6, wherein identifying the supplementary information comprises identifying the supplementary information corresponding to information on the detected position of the SFD code by using a supplementary information mapping table shared by a transmission unit and a reception unit.

8. An apparatus for receiving packet information by using a Start Frame Delimiter (SFD), the apparatus comprising:
- a preamble detector for detecting a preamble field corresponding to the SFD and recognizing a time point of reception of an SFD field within the detected preamble field; and
- an SFD code matching filter for identifying the position of the SFD code received from a SFD transmission unit, and identifying supplementary information mapped to the position of the SFD code, wherein the apparatus analyzes the identified supplemental information.

9. The apparatus as claimed in claim 8, wherein the SFD code matching filter identifies the mapped supplementary information through a supplementary information mapping table.

10. The apparatus as claimed in claim 8, further comprising an SFD detector for detecting a first start point of the SFD field and a time point of an occurrence of a maximum correlation value within a time period of the SFD field,
- wherein the SFD code matching filter identifies the supplementary information according to the first start point of the SFD field and the time point of the occurrence of the maximum correlation value.

* * * * *